Figure 2:
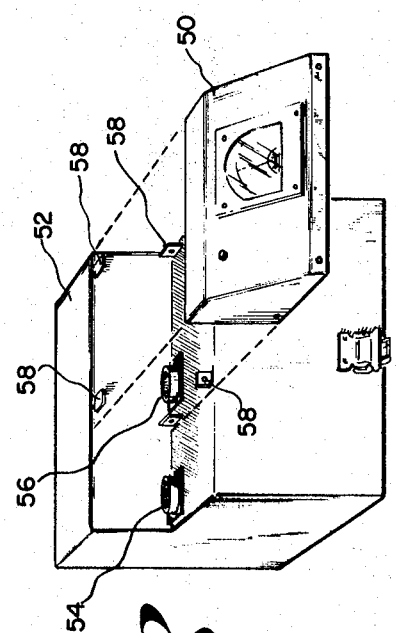

United States Patent

[11] 3,617,850

| [72] | Inventor | Ernest H. Domshy |
| | | Downey, Calif. |
| [21] | Appl. No. | 782,199 |
| [22] | Filed | Dec. 9, 1968 |
| [45] | Patented | Nov. 2, 1971 |
| [73] | Assignee | North American Rockwell Corporation |

[54] BATTERY-STATUS DEVICE
10 Claims, 2 Drawing Figs.

[52] U.S. Cl.................................................. 320/31, 320/23, 320/35, 320/44, 320/48
[51] Int. Cl..................................................... H02j 7/00
[50] Field of Search............................................ 320/2, 23, 24, 45, 44, 43, 46, 47, 48, 21, 31, 35

[56] References Cited
UNITED STATES PATENTS

| 3,484,681 | 12/1969 | Grady, Jr. et al. | 320/48 X |
| 1,430,107 | 9/1922 | Ogden | 320/44 |
| 2,136,716 | 11/1938 | Tolle | 320/23 |
| 2,157,139 | 5/1939 | Mirick | 320/35 |
| 2,347,452 | 4/1944 | Amsden | 220/23 |
| 2,627,060 | 1/1953 | Berg | 320/23 |
| 2,835,862 | 5/1958 | McNutt | 320/45 |
| 3,230,439 | 1/1966 | Sobel | 320/30 |
| 3,271,652 | 9/1966 | Waltz | 320/44 |
| 3,329,882 | 7/1967 | Sobel | 320/45 |
| 3,421,067 | 1/1969 | Wilson | 320/23 |

*Primary Examiner*—J. D. Miller
*Assistant Examiner*—John M. Gunther
*Attorneys*—William R. Lane, Allan Rothenberg and Sid Magnes ABSTRACT: This disclosure is directed to a battery and a battery-status device that indicates at all times the energy available from a battery. The arrangement is such that it takes into consideration: the energy drawn from the battery, the energy that is pumped back into the battery, the past history of the battery (whether it has been on standby duty or has been in a constant charge/discharge usage), the age of the battery, and the temperature of the battery—the temperature measurement being useful for two purposes—namely; to heat the battery to its proper operating temperature, and to vary the status-indication to show the amount of energy available at that temperature.

INVENTOR.
ERNEST H. DOMSHY
BY
Sidney Magnes

BATTERY-STATUS DEVICE

BACKGROUND

It is well known that the usual battery can have a given amount of electrical energy stored within it; and that this energy is withdrawn to perform given tasks. As a result, the battery eventually becomes "discharged", i.e., it contains so little energy that it can no longer satisfactorily perform its function. Depending upon its type, some batteries may be "recharged" in order to again store enough energy to achieve the desired function.

The type of battery known as a "dry-cell" does not lend itself to readily recharging; whereas the "storage" battery—such as is used in an automobiles—is of the type that is continually being discharged and recharged in order to maintain it at or near a fully charged state. Other types of batteries, such as are used for emergency power, are usually in a fully charged standby state, until an emergency arises—whereupon they are called upon to perform the desired function.

In general, the rechargeable operation described above works quite well; except for two conditions: namely, the battery ages—so that its charge/discharge characteristic changes; and the battery changes its capabilities depending upon temperature. While these two conditions are well known, no satisfactory indication of their effects had been found in the past.

OBJECTS AND DRAWINGS

It is therefore an object of this invention to provide an improved unitized battery and battery-status device that (A) produces a status-indication that is corrected by factors relating to the battery's age, usage, temperature, etc.; and (B) is capable of maintaining the battery at its optimum charge point in response to the above indication.

Figure 1:
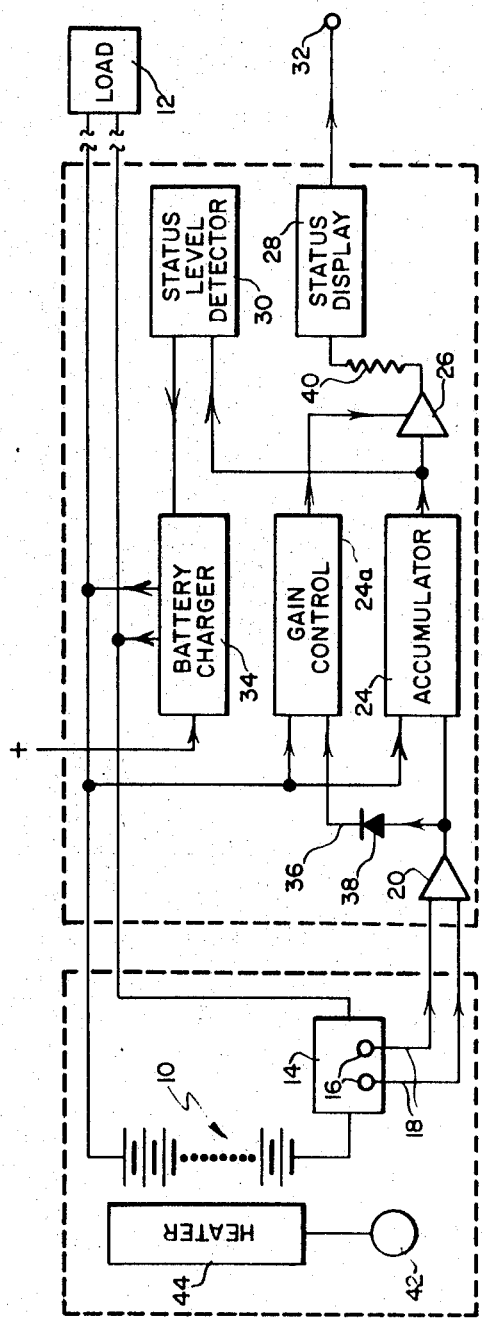

The attainment of these objects and others will be realized from the following detailed description, taken in conjunction with the drawings, of which:

FIG. 1 shows a composite block-diagram and schematic-representation of the battery and battery-status device; and FIG. 2 shows an illustration of the unitized package.

INTRODUCTION

As indicated above, most present-day storage-batteries can be used for an appreciable length of time before they become useless; their gradual degradation being accompanied by a couple of inherent characteristics. For example, as these storage-batteries become depleted, their "terminal-voltage" tends to decrease gradually; and therefore a so-called "voltage-test" can give a rough indication of the status of the battery. In a similar manner, as these batteries become depleted, their liquid contents change characteristics; and this change can be detected by means of an instrument, known as a "hygrometer," that measures the specific-gravity of the liquid. Still another test is the so-called "load test," wherein the battery is connected to provide electricity for a load, and its voltage is measured meanwhile.

In many types of batteries, such as the NiCAD battery, these characteristics are not present, or these measurements are not readily available. For example, these newer batteries are designed to maintain a substantially constant voltage until complete depletion, whereupon the voltage drops off rapidly to zero; and this type of voltage characteristic is such that a voltage-test will not indicate the status of the battery. Many of these newer batteries are also hermetically sealed, in part to permit them to be used at different orientations; and this hermetical sealing prevents access to the liquid (if any) for hygrometer tests.

It therefore becomes desirable to provide a battery-status device that can indicate how much electrical energy is still stored in the battery, in the absence of these prior-art measurements; and it has been determined that the best way to accomplish this is to use the past history of the battery. For example, assume that a fully charged brand-new battery is placed in service; and used immediately until it is only half charged; it may then be recharged to its original status—at which time it will again be in a fully charged brand-new condition. The status indication may be achieved by recording the amount of energy taken from the battery. A comparison of these two values would indicate the fully charged status of the battery.

Under the brand-new-battery assumption made above, if the amount of energy pumped into the battery is equal to the amount of energy originally withdrawn, and the new-battery would again be fully charged. However, it is known that as a battery ages, or is used to a great extent, this energy in/out relationship is not completely true; that is, the discussed amount of recharging would not cause the battery-status indicators, i.e., they would indicate a "full" battery even though the battery is not fully charged; and the present disclosure will show how this situation can be corrected.

It is also known that a battery becomes less efficient in colder weather; so that whereas prior-art battery-status displays indicated that the battery was fully charged, in actuality the battery was capable of delivering only a portion of its rated power. This discrepancy has been another disadvantage of prior-art equipment; and the present disclosure teaches how this situation may be overcome.

It is also known that a battery operates best at a given temperature, despite the fact that it may be in a very cold climate. The present disclosure also indicates how this situation can be corrected.

Battery-type power-sources are widely used, because of their numerous desirable, characteristic capabilities. For example, a battery inherently provides substantially the same voltage; whereas other devices (such as generators, etc.) need relatively complex voltage-regulating circuits. A battery-type power-source is instantly available, since there is no mechanical devices that may fail to operate. For these reasons—and others—batteries are frequently used to drive tools, to move submarines, to power remote electronic equipment, to provide emergency lighting, etc.

In the past, it was necessary to continually monitor the "stand-by" batteries, in order to assure that they were always properly charged and capable of proper functioning; and with the above known weaknesses of prior-art battery-status equipment, good maintenance practice required that the batteries be changed before there was danger of their failing—even though a true status-indication would indicate that the batteries were still serviceable.

SYNOPSIS

The present disclosure is directed to a battery and battery-status indicator that is based, primarily, on measurement of withdrawn and replaced energy. The instantaneous status is shown on a local meter and/or at a remote location; and if desired, the status indicator may be used to operate a battery-charger. The battery's age and its usage—as indicated by its charge/discharge history—is used to correct the status-indication; and the temperature-measurement is also used to modify the status-indication.

All of this equipment may be incorporated into the battery-casing to provide a unitized arrangement, with—if desired—various plugs and connectors for external apparatus.

THE DISCLOSURE

Referring now to FIGURE 1, there is indicated a battery 10 whose status is to be monitored, and—if desired—controlled. Battery 10 supplies power to a load 12, the electricity passing through a so-called "shunt" 14 positioned in the connection between battery 10 and load 12. Shunt 14 has a pair of output-terminals 16 that produce an output-voltage whose value depends upon the amount of current flowing through shunt 14. The "current-flow" voltage at terminals 16 is applied over wires 18 to an amplifier 20. This amplification is desirable because the current-slow voltage will ordinarily be quite small, ranging from zero volts up to about 100 millivolts; and the amplification facilities subsequent circuitry. The output of amplifier 20 is applied, for reasons to be discussed later, to an "accumulator" 24; the output signal of accumulator 24 being further amplified, if desirable, in amplifier 26; and then being applied to a status-display 28.

ACCUMULATOR OPERATION (I)

It should be noted that when battery 10 is providing electric current to load 12, the current flows through shunt 14 in a given direction; and therefore, the current-flow signal at wires 18 has (A) a magnitude that corresponds to the current flowing through the shunt, and also has (B) a polarity that indicates that the battery is discharging. The amplified current-flow signal from amplifier 20 is applied to accumulator 24; and accumulator 24 sums up (i.e., "integrates") the current-flow signal with respect to the signal's magnitude, polarity, and time-duration. Accumulator 24 thus acts as an adder, its instantaneous output—in this case—being a measure of the discharging of the battery, or of the instantaneous status of the battery. Its output is ordinarily a sustained DC signal.

Since the output of accumulator 24 is also a small-magnitude voltage, it may be desirable to apply it to an amplifier 26; whose status-signal output is in turn applied to a status-display 28—which may be a meter whose reading indicates the status of the battery. Where desired, the status-signal applied to status-display 28 may also be applied to an output terminal 32, so that the battery-status may be shown at a remote location.

Thus, the battery and its status-indicator—with or without ancillary equipment and circuitry—may be incorporated into a unitized or a plug-in package. When a battery is monitored, purchased, exchanged, rented, etc. a cursory examination will quickly indicate the battery's status and suitability for immediate use.

BATTERY CHARGING

As indicated above, many batteries can be recharged in order to bring their available power up to a maximum; and power for recharging the battery is often available—i.e., hospitals, remote-stations, etc.

In FIG. 1, the output of integrator 24 is shown as also being applied to a status-level detector 30 that controls the operation of a battery-charger 34 that is energized from a suitable external source. Status-level detector 30 may take various forms, such as a Schmidt-trigger circuit that produces signals at selected battery-levels at which a battery-charger 34 is turned on and off. Alternatively, level-detector 30 may be a tristate device to indicate the need for a fast-charge, a slow-charge, or a trickle-charge.

Many types of battery chargers are known; most contain suitable diodes to prevent the battery from discharging through the charger; some contain other circuitry that permits the battery to charge rapidly, slowly, or at a trickle-charge rate, depending upon the signals received from status-level detector 30; and other charges are of the fail-safe type that prevents overcharging the battery. Another type of battery-charger continuously trickle-charges; and has one or more fast-charging rates that are controlled by level-detector 30.

In any case, the disclosed circuitry acts to charge battery 10 as needed—battery-charger 34 being either a separate unit, or being utilized along with the battery and circuitry.

ACCUMULATOR OPERATION (II)

Referring back to FIGURE 1, it was pointed out that when battery 10 supplied an electric current to load 12, the current flowed in a given direction through shunt 14; and produced a "load" signal-voltage having an amplitude corresponding to the load-current, having a time-duration corresponding to the load-demand, and having a given polarity corresponding to the direction of load current flow. This load-signal-voltage is, as discussed above, applied to accumulator 24.

It should be noted that when battery-charger 34 is operating, it produces a charging-current that flows in the direction opposite that of the load-current. This charging-current also flows through shunt 14; which thereupon produces a "charge" signal-voltage having an amplitude corresponding to the charging-current, having a time-duration corresponding to the charging-time, and having an opposite polarity—corresponding to the direction of charging-current flow. This charge-signal voltage is also applied to accumulator 24.

Accumulator 24 operates in such a manner that it adds all the charge-signal voltages, and subtracts all the load-signal voltages; thus "integrating" these inputs to produce a signal corresponding to the charge/discharge status of the battery.

A number of such current/time accumulators are commercially available. One, for example, is obtainable from Curtis Instruments, Inc. of Mount Kisco, New York; and is identified as their Model 921. A somewhat similar integrator is available from Gulton Industries, Inc. at Hawthorne, California; being known as their Ampere-Hour Meter, Model EMAM120. Similar devices are disclosed in U.S. Pats. No. 3,045,178; 3,255,413; and 3,344,343; among others. These devices are known by a number of different names; ampere-hour meter, voltage-time integrator, operation indicator, coulometer, retained-capacity indicator—among others. Therefore the term "accumulator" is to be construed to mean a device of this type.

In any case, the integrator-signal is applied to status-display device 28, which indicates the battery's status; and is also applied to status-level detector 30, which controls the operation of battery-charger 34.

BATTERY-DEGRADATION COMPENSATION

It was previously indicated that the status of the battery depends, to a great extent, upon its past history. In those cases where the battery has been on light duty, there has been very little load or charging current passing through shunt 14 in either direction; so that the signal-voltages applied to integrator 24 were few, small, and of short duration. Battery-degradation is therefore quite small; and the display device would truly indicate a fully charged battery.

If, on the other hand, battery 10 is an older battery, or had been on heavy duty, and/or a constant charge/discharge sequence, much load and charge-current would have passed through shunt 14; and the signal-voltages would have been many, large, of long duration, and of frequent polarity-reversals.

In both of the above cases, this battery-history information is available—in the form of the current-flow signals—at the output of amplifier 20; and may be used as follows. A connection 36 is connected to the output of amplifier 20; and feeds the signals from the amplifier to a suitably poled diode 38. Diode 38 selects either the charging-signal or the load-signal; these being applied to a second integrator 24a, that is used for gain-control. Thus, a light-load circuit would cause the diode to produce few, small, short-duration signals; so that second integrator 24a would produce a low-magnitude control-signal. Conversely, a heavy-load circuit would cause the diode to produce many, large, long-duration signals; so that second integrator 24a would produce a large-magnitude control-signal. Thus, the control-signal from the second integrator 24a corresponds to the age and/or duty-cycle of the battery; and, in this way, to the battery degradation.

Knowing, from the battery-manufacturer's technical literature, the degradation of the battery due to the above conditions, the control-signal from integrator 24a is used to change the gain of amplifier 26 in a compensatory manner. In this way each charging (or discharging) cycle produces a progressively smaller gain for amplifier 26; so that a progressively lower indication on status-display indicates—not the theoretical battery status—but a truer status of the battery's power capabilities in accordance with the battery's history.

A short digression would be enlightening at this point. A given load would deplete the battery a given amount (A); but an identical recharge (A) would not, in the case of an older battery, reestablish its original status. Therefore, the charging current-flow would have to be larger than A.

In FIGURE 1, diode 38 may be poled to transmit either the load-signal voltage or the charge-signal voltage. Since the charge-signal voltage tends to become larger than the load-signal voltage, as the battery ages, it reflects the battery-history in a better manner. Therefore, diode 38 is preferably poled to let the second accumulator 24a use the charge-signal voltages.

TEMPERATURE EFFECTS

It was pointed out above that a low temperature prevents a battery from producing its maximum energy. Suppose, for example, that a fully charged new-battery is connected into the circuit in a cold climate. Under these conditions prior-art status-indicators would have shown that the battery is fully charged, and ready to supply its rated output; when obviously this latter is not true, because of the low temperature.

The present disclosure provides a truer temperaturewise status-indication by inserting a temperature-sensitive resistor 40 at the input of status-display 28. These resistors are readily available in many types—such as model TM 1/4 made by Texas Instrument Company; this particular unit having a temperature coefficient of 0.7 percent per degree centigrade. The selected temperature-sensitive resistor 40 has the characteristic that its resistance increases with lowered temperatures; so that as the temperature drops—and the power-delivery capacity of the battery drops concurrently—the increasing resistance lowers the signal applied to status-display 28; this accordingly lowering the displayed status. In this way, the status-display provides a true compensated-indication of the power available from the battery at that temperature—without activating level-detector 30 to overcharge the already fully charged battery.

Alternatively, the temperature-sensitive resistor 40 may be replaced by a thermostat and another gain-control circuit, so that the instantaneous temperature also reduces the gain of amplifier 26; thus reducing the display.

Since it is known that a battery operates best at a given temperature, a thermostat 42 senses the temperature to which the battery is exposed; thermostat 42 controlling a heater 44, which may be energized in any desired manner. Heater 44 raises battery 10 to its optimum operating temperature, at which time the thermostat turns off the heater.

It should be noted that as heater 44 warms the battery, it also warms the temperature-sensitive resistor 40; and as this becomes warm, its resistance decreases—thus increasing the display on status-device 28. In this way, the battery's true power status is indicated.

It should be noted that status-display 28 (depending upon the type chosen) may be a column of liquid, a meter, or the like. Some meters—such as Meter Model 503, made by the A. P. I. Instrument Company of Chesterland, Ohio—have internal adjustable electrical contacts that produce output signals when the indicating-needle moves to a selectable predetermined value; indicating-meters of this type may be used to replace status-level device 30.

Other elements shown in FIGURE 1 are well known; and are readily available on the open market. For example, shunts, as designated by reference character 14, are available from General Electric Corporation and Westinghouse; and battery-chargers are available in many forms; some being described in U.S. Pat. Nos. 1,596,131; 2,432,068; 2,746,002; and 3,209,230; among others.

FIGURE 2 illustrates a partly unitized package. Module 50 contains the desired circuitry and status indicator; and unit 52 contains the battery portion. Suitable connectors 54, 56 complete the necessary interconnections; and locking tabs 58 permit adding the circuitry portion to any battery-portion.

What is claimed is:

1. The combination, for use with a battery, comprising:
   means for producing current-flow signals indicative of the magnitude, duration and direction of the current-flow to and from said battery;
   means, comprising an accumulator responsive to said current-flow signals, for producing a status-signal;
   means, comprising a display-device, for displaying a status corresponding to said status-signal from said accumulator;
   means for charging said battery;
   means for detecting the status-level of said battery;
   means for causing said status-level detector to control said battery-charging means;
   a heater;
   a temperature-sensitive device; and
   means for causing said temperature-sensitive device to control said heater for heating said battery to an optimum temperature.

2. The combination of claim 1 including means responsive to the ambient temperature for modifying said means for displaying in accordance with the temperature of said battery.

3. The combination of claim 1 including means responsive to said means for charging for modifying said means for displaying accordance with the history of said battery.

4. The combination for use with a battery comprising:
   means for producing current-flow signals indicative of the magnitude, duration and direction of the current-flow to and from said battery;
   means, comprising accumulator responsive to said current-flow signals, for producing a status-signal;
   means, comprising a display-device, for displaying a status corresponding to said status-signal from said accumulator;
   means for transmitting said status-signal to a remote location;
   means for charging said battery;
   means for detecting the status-level of said battery;
   means for causing said status-level detector to control said battery-charging means;
   means for modifying said displayed-status in accordance with the temperature of said battery;
   means for modifying said displayed-status in accordance with the history of said battery;
   a heater;
   a temperature-sensitive device; and
   means for causing said temperature-sensitive device to control said heater for heating said battery to an optimum temperature.

5. The combination, for use with a battery, comprising:
   means, capable of supplying a battery-charging current, for providing variable-rate charging of said battery;
   shunt means, connected as part of said battery's circuit, for producing current-flow signals indicative of the magnitude, duration, and direction of the current-flow to and from said battery;
   first amplifying means for amplifying said current-flow signals;
   means, comprising a first accumulator responsive to said amplified current-flow signals, for producing a status-signal;
   second amplifying means for amplifying said status-signals;
   means, comprising a second accumulator responsive to said amplified current-flow signals, for producing a gain-control signal for controlling the gain of said second amplifying means;
   a meter;
   means, comprising a temperature-sensitive resistance connected as the input circuit of said meter, for modifying said amplified status-signal to compensate for the temperature of said battery;
   means for applying said modified status-signal to said meter for producing a status-display;
   means for transmitting said modified status-signal to a remote location;

means, responsive to said status-signals, for producing a battery-charger control-signal;

means for applying said battery-charger control-signal to said battery-charger;

a heater;

a thermostat; and means for causing said thermostat to control said heater.

6. In combination with a battery, a battery-charger, means for producing current-flow signals, and a status-display device, the combination comprising:

a first amplifier;

means for applying said current-flow signals to the input of said first amplifier;

a first accumulator;

a connection from the output of said first amplifier to the input of said first accumulator;

a second amplifier having a controllable gain;

a connection from the output of said accumulator to the input of said second amplifier;

a connection from the output of said second amplifier to the input of said display-device;

a second accumulator;

means, comprising a diode connected between the output of said first amplifier and the input of said second accumulator, for producing signals corresponding to the charge current-flow to said battery; and a connection from the output of said second accumulator to the gain-control input of said second amplifier.

7. The combination of claim 6 wherein the connection to the input of said display-device comprises a temperature-sensitive resistor.

8. A battery-status device for determining the charge-status of a storage battery, said device comprising:

first means for providing an indication of the state to charge of said battery;

second means, responsive to said first means, for charging and maintaining said battery at optimum charge; and fourth means for modifying the indicated state of charge provided by said first means in accordance with the temperature of said battery.

9. A battery-status device for determining the charged-status of a storage battery, said device comprising:

first means for providing an indication of the state of charge of said battery;

second means, responsive to said first means, for charging and maintaining said battery at optimum charge;

third means for measuring the total charge that said second means supplied to said battery and changing the response of said first means in accordance with the total charge supplied;

said first means including:

signal means for producing a positive signal that is indicative of the current supplied by said battery and a negative signal that is indicative of the current supplied to said battery by said charging means; and first accumulator means responsive to said positive and negative signals for providing a first signal that is proportional to the net charge available from said battery; and said third means comprising a second accumulator means responsive to said negative signal for providing a second signal which is proportional to the total charge supplied to said battery, said second signal being coupled to said first means for changing the response of said first means and, in turn, said first signal in accordance with the total charge supplied; and a fourth means for modifying the indicated state of charge provided by said first means in accordance with the temperature of said battery.

10. A battery-status device for determining the charged-status of a storage battery, said device comprising:

first means for providing an indication of the state of charge of said battery;

second means, responsive to said first means, for charging and maintaining said battery at optimum charge;

third means for measuring the total charge that said second means supplied to said battery and changing the response of said first means in accordance with the total charge supplied;

said first means including:

signal means for producing a positive signal that is indicative of the current supplied by said battery and a negative signal that is indicative of the current supplied to said battery by said charging means; and first accumulator means responsive to said positive and negative signals for providing a first signal that is proportional to the net charge available from said battery; and said third means comprising a second accumulator means responsive to said negative signal for providing a second signal which is proportion to the total charge supplied to said battery, said second signal being coupled to said first means for changing the response of said first means, in turn, said first signal in accordance with the total charge supplied;

said second means including a shunt placed in series with one of the output leads from said battery so that a potential drop is produced thereacross;

two leads fixed to spaced terminals on said shunt so that positive and negative signals are positive and negative potential differences, respectively, between said leads;

said first means further including: a first amplifier to amplify said potential differences, said first amplifier being disposed between said shunt and said first and second accumulator means;

said first accumulator means including a first accumulator and a second amplifier coupled to the output of said first accumulator for amplifying the output of said first accumulator, said second amplifier includes an adjustable gain control means which is responsive to said second signal supplied by said second accumulator means to modified said first signal which is outputted by said second amplifier;

a display for displaying the output of said second amplifier; and said fourth means including a resistor having the properties of increasing in resistance as the ambient temperature drops and coupled between said second amplifier and said display.

* * * * *